July 8, 1947.  W. L. MacARTHUR  2,423,601
SHEAR FOR FRANGIBLE MATERIALS
Filed Oct. 13, 1945
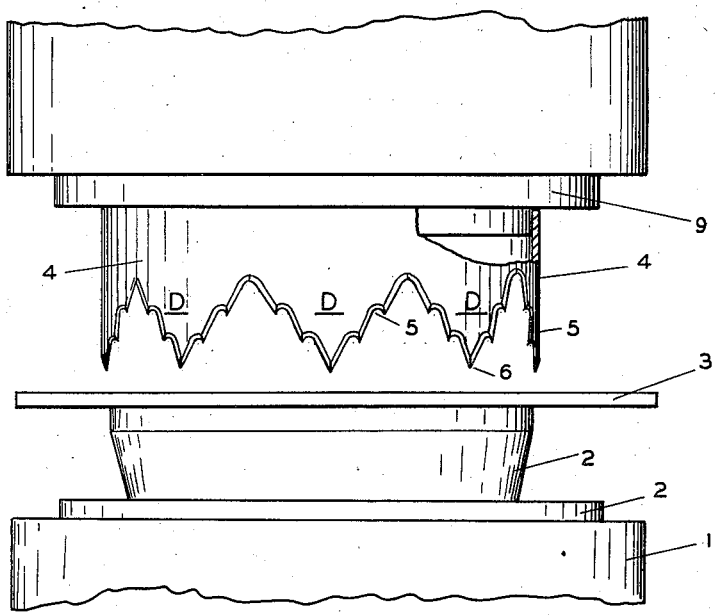
Fig. 1
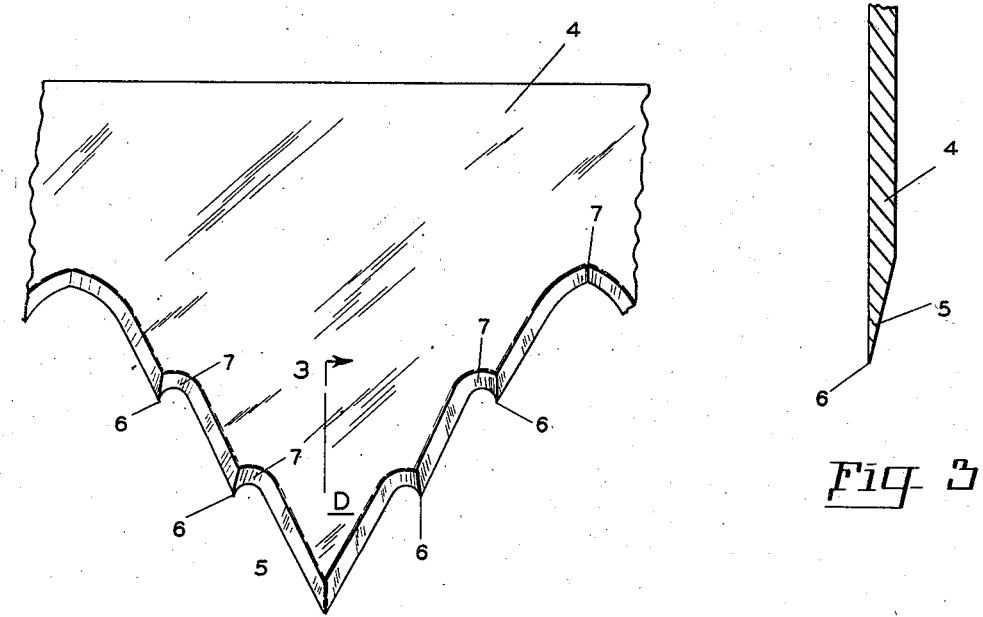
Fig. 2
Fig. 3
INVENTOR
WILLIAM L. MACARTHUR
BY
G. F. McDougall.
ATTORNEY Patented July 8, 1947

2,423,601

UNITED STATES PATENT OFFICE 2,423,601

SHEAR FOR FRANGIBLE MATERIALS

William L. MacArthur, Seattle, Wash.

Application October 13, 1945, Serial No. 622,157

7 Claims. (Cl. 164—29)

This invention relates to power shears and power presses. Specifically, it relates to shears for frangible materials. Still more specifically, it is shown as a reciprocating knife that works cooperatively with a matching die for use in "blanking" plywood, especially when the plywood blank is separated from the sheet on other than a straight line.

It is an object of the present invention to overcome the objectionable results of blanking with conventional dies, which are compression of areas near to the point of severance with resulting splintering for a short distance back from the edge.

With the excellent qualities of plywood being increasingly appreciated, its use is expanding and is already large in quantity production of articles cut from sheets, where the line of the cut is much better adapted to a shear or press than to severance by a saw. It is to this sort of production that my new invention is best adapted.

A drawing accompanies and forms a part of this specification and illustrates its employment for cutting circular pieces of plywood, as a shape that is not bounded by straight lines.

In the drawing:

Fig. 1 is a fragmentary portion of a press, comprising a movable press member ram and a bed with the invention attached thereto;

Fig. 2 is an enlarged fragmentary view of a shear blade according to the invention and as employed in Fig. 1; and Fig. 3 is a section of the structure of Fig. 2 taken on the line 3—3 of Fig. 2.

Further describing the drawing and the several figures thereof: Numeral 1 represents a press bed; 2' is a removable lower die plate that will be firmly secured to the bed 1, after the manner of such parts in presses for other cutting parts; 2 represents the lower element of the die set required to effect a shearing action in conjunction with the shearing blade; 4 represents a shear blade and 3 indicates a sheet of material in place on the die plate to be cut. In this particular embodiment, it will be a circular or disc-like piece, perhaps for a child's toy part.

Next above the sheet 3, is the shear blade 4, which is the whole invention but needs the associated parts to cooperate or it could not discharge its function. To begin the description of this shear blade, it will be noted first that it is beveled as shown plainly at 5 in Fig. 3, and also in Fig. 2. In this instance, where the disc is to be the product, the edges of which are to be preserved, the bevel is on the outside, as shown. If, on the other hand, the desired result should be a smooth hole in the sheet 3, then the die plate 2 would be provided with a hole in the center and supporting area around its boundaries while the bevel would be on the inside of the blade.

The form of the beveled edge 5 is important. To apply a diagonally downward shearing cut, the beveled cutting edge is dentate, each of the teeth D being peculiarly incised with sharp pointed incisors along its slanting edge. This construction is best shown in Fig. 2 which shows one large tooth, meaning the whole figure, having two incised teeth on each cutting edge, the incised teeth having axes parallel to the main axis of the tooth. The number of these incised teeth will depend on the length of the flank. It will be noted that the points of the incised teeth are sharp on both sides so that any tendency of the material to split will be arrested almost at once by a point penetrating the material ahead of the split and starting a cut backwards to meet the oncoming cut, which requires a curved throat 7. Between the teeth D, will also be a curved throat 7'.

The word "incised" as used here is borrowed from the science of botany, which calls an oak leaf incised because it is deeply and sharply notched. Zoology also employed the term for an incisor tooth, shaped for cutting, though the incisor tooth of zoology is not always provided with an elongated cutting edge on one side with a curved throat on the other.

Above the shear blade 4 is a blade mounting and reciprocably mounted blade holder 9. These representations are diagrammatic only and being no part of the invention claimed, are considered to represent any suitable mounting for the shear blade 4 that will be capable of repeatedly causing the blade to selectively make identical cutting strokes.

It will be obvious that the invention can be formed to sever a sheet of frangible material on a straight line as well as a curved or angular one, if it is commercially desirable to use the cutter instead of a saw and that also angular and other irregular shapes are just as easily cut as circles. Also, when cutting plywood sheets made with phenolithic and such-like resins, a saw that can be filed for resharpening does not stand up well, and in such cases a knife of the type shown is much better.

Having fully disclosed my invention so that anyone familiar with the related arts can make and employ it, what I claim as new and desire to secure by Letters Patent, is:

1. In a cutter for frangible materials to do cutting by being pressed thereagainst, a dentate cutter blade having a plurality of relatively large pointed teeth spaced along its cutting edge, the edges of said teeth being generally angular and sloping away from the points, said sloping edges incised with sharp pointed incisor teeth spaced apart and with the axes of said incisors generally parallel to the axes of the main teeth of which they form a part.

2. A cutter blade for frangible material to cut by being pressed thereagainst in cooperation with a die fitted to the cutter blade, consisting of a cutting edge of dentate form, having large teeth spaced therealong, said teeth of generally pointed form with sloping edges, said sloping edges having formed integral therewith a plurality of incisor teeth having points, said points projecting beyond the general outline of the cutting edge of which they are a part, the axes of said incisors substantially parallel with the axes of the large teeth.

3. A cutter for sheets of frangible material comprising a cutter structure formed with a toothed cutting edge, all cutting edges being beveled, sharp and of generally angular form, each angular tooth having two flanks that slope back and away from the point, each flank having formed thereon a plurality of incisor teeth, the points of which extend outward from said flank with axes in a plane similar to the axes of said first named teeth.

4. In cutting apparatus for frangible material, a cutter to be pressed against the material and penetrate the same, being a continuous dentate edge cutter having relatively large, generally triangular beveled edge teeth, said teeth having points and sloping sides to produce shearing diagonal action at separated points seriatim, said sloping sides having incisor teeth projecting beyond the general line of the edge of the side and having sharp points so positioned that they will start to penetrate a flat surface before the cut produced by the shearing action has proceeded to the position attacked by the incisor points.

5. A cutter for blanking frangible material around an entire perimeter consisting of an endless shear blade for cooperation with a die plate, said shear blade having a deeply toothed cutting edge, each tooth having flanks that slope away from a point, each flank having formed thereon smaller teeth that have projecting points and said cutter having a continuous beveled edge.

6. A cutting tool for blanking frangible material comprising a cutter for pressing against and through a sheet of material, the cutting edge of said cutter being dentate in form with beveled edges, sharp points on the teeth and flanks for the teeth that slope away from the teeth to form notches therebetween, each tooth flank having formed thereon a plurality of pointed generally triangular teeth sharpened on both sides and of such length that they will contact a flat surface to penetrate the same before the cutting action of the main tooth has reached the point of contact.

7. A cutting tool for blanking frangible material comprising a cutter for pressing against and through a sheet of the material to be blanked, the cutting edge of said cutter being of toothed form with beveled edges, sharp tooth points and flanks for the teeth that slope to form notches between the teeth, the bottoms of the notches being curved, each of said flanks carrying sharp pointed incisor teeth as a continuous part of its cutting edge, said incisor teeth projecting outward far enough to make independent contact with material and cut backwards towards the cut of the tooth of which they form a part.

WILLIAM L. MacARTHUR.

REFERENCES CITED

The following references are of record in the file of this patent:

UNITED STATES PATENTS

| Number | Name | Date |
|---|---|---|
| 1,483,661 | Hall | Feb. 12, 1924 |
| 1,453,200 | Stacho | Apr. 24, 1923 |
| 1,161,705 | Lloyd | Nov. 23, 1915 |